United States Patent [19]

Austin et al.

[11] 4,061,237

[45] Dec. 6, 1977

[54] FORKLIFT TRUCK

[75] Inventors: Stephen R. Austin, Winnetka; George J. Stevenson, Wilmette, both of Ill.

[73] Assignee: The Brevet Corporation, Glenview, Ill.

[21] Appl. No.: 594,634

[22] Filed: July 10, 1975

[51] Int. Cl.[2] .................. B60P 1/64

[52] U.S. Cl. .................. 214/515; 187/9 R

[58] Field of Search .................. 214/515, 75 R; 187/9 R, 187/9 E

[56] References Cited

U.S. PATENT DOCUMENTS

| | | | |
|---|---|---|---|
| 1,875,103 | 8/1932 | Mosel | 187/9 R |
| 2,804,174 | 8/1957 | Chasar | 187/9 R |
| 3,563,341 | 2/1971 | Bultman | 187/9 R |
| 3,799,379 | 3/1974 | Grether et al. | 214/515 |

*Primary Examiner*—Trygve M. Blix
*Assistant Examiner*—Jesus D. Sotelo
*Attorney, Agent, or Firm*—Dressler, Goldsmith, Clement, Gordon & Shore, Ltd.

[57] ABSTRACT

Apparatus for storing a mobile forklift truck on top of a raised platform such as a loading dock or the floor of a transport truck, and to an improved forklift truck for use in such apparatus. The apparatus includes a pair of stirrups mounted on top of the raised platform to receive the fork tines of the forklift truck, so that when the tines are lowered far enough, the forklift truck is lifted up until its drive wheel is level with the top of the raised platform. The apparatus also includes a collapsible support arm movable between an out-of-the-way position and an operative position level with the platform top, where the support arm engages the drive wheel of the forklift truck. The improved mobile forklift truck of this invention has a "ready condition" in which it can be brought into position for self-storage on the raised platform, in which condition forwardly extending wheels can move through a restricted "collapsing zone" having specified boundaries into out-of-the-way storage positions. Several embodiments of the improved forklift truck are disclosed, in each of which the upper boundary of the forward portion of the collapsing zone is low enough that the support wheels retracted into out-of-the-way storage positions do not strike any downhanging parts of the raised platform, and the rear boundary of the collapsing zone is far enough forward to avoid any protrusions that would interfere with freedom of movement of the operator behind the forklift truck.

33 Claims, 18 Drawing Figures

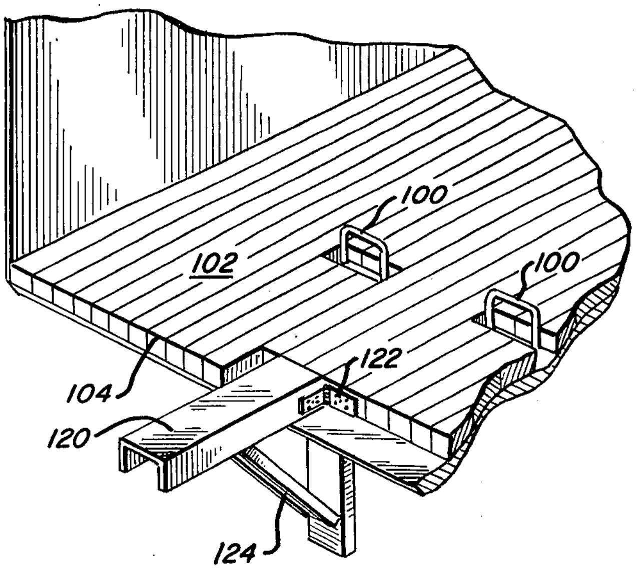
FIG. 9
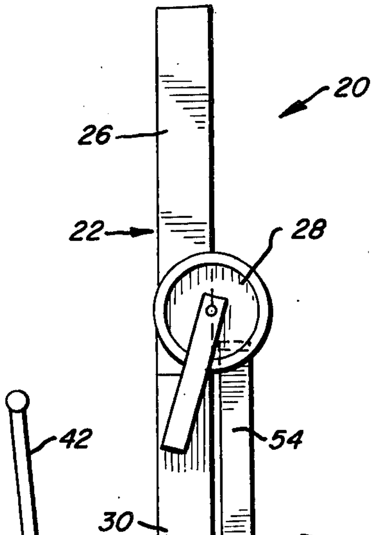
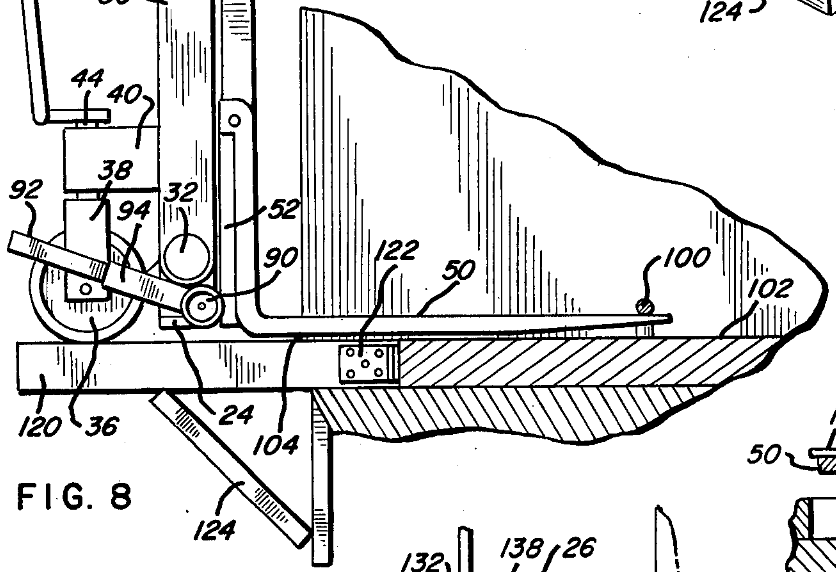
FIG. 8
FIG. 10
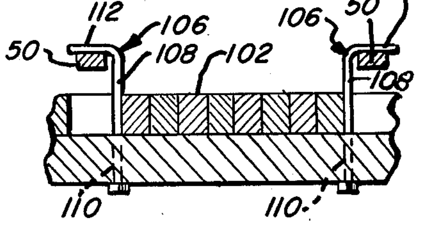
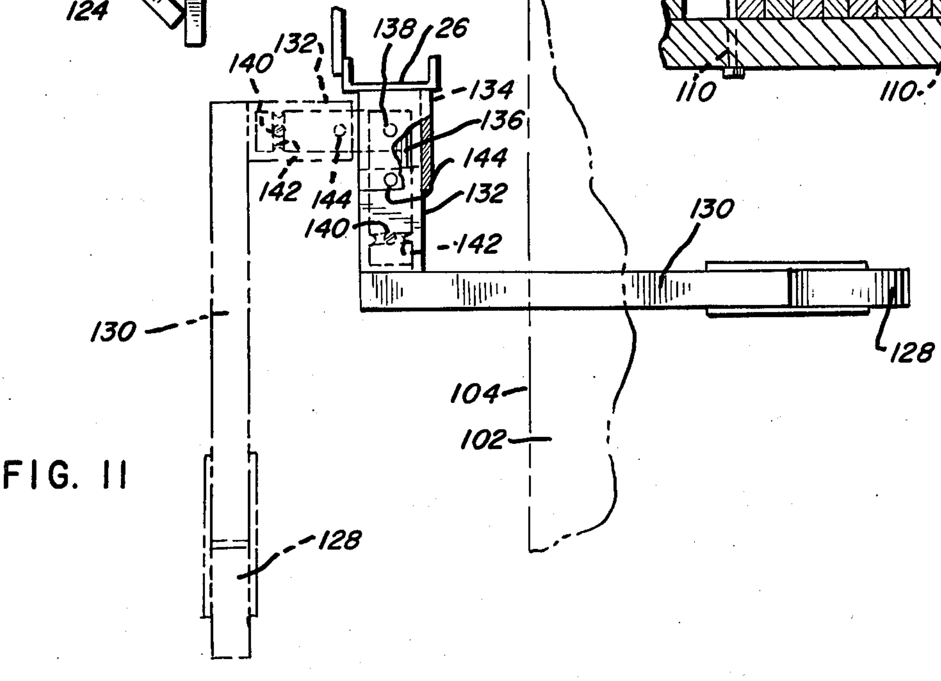
FIG. 11

FIG. 13
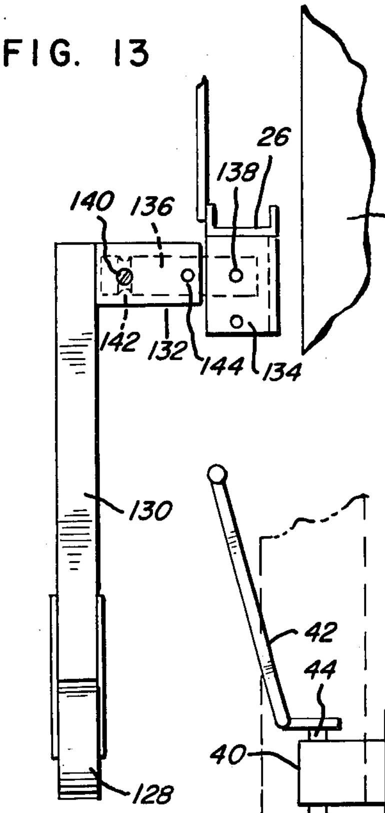
FIG. 14
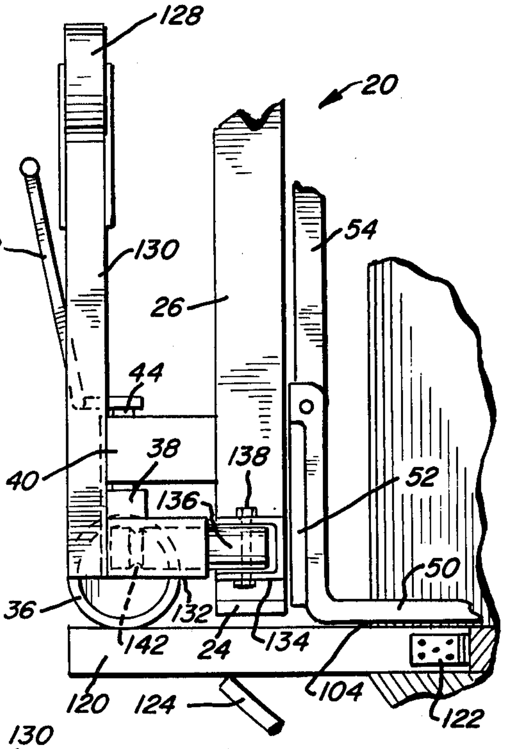
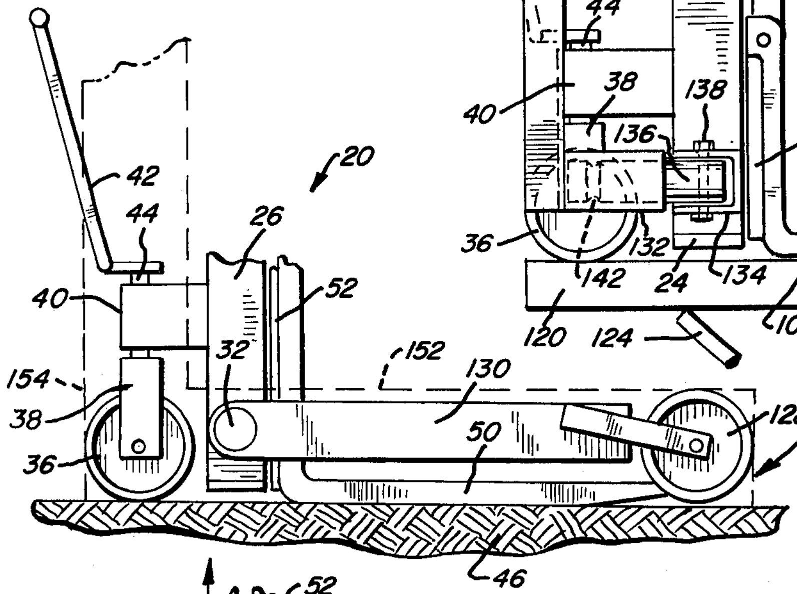
FIG. 12
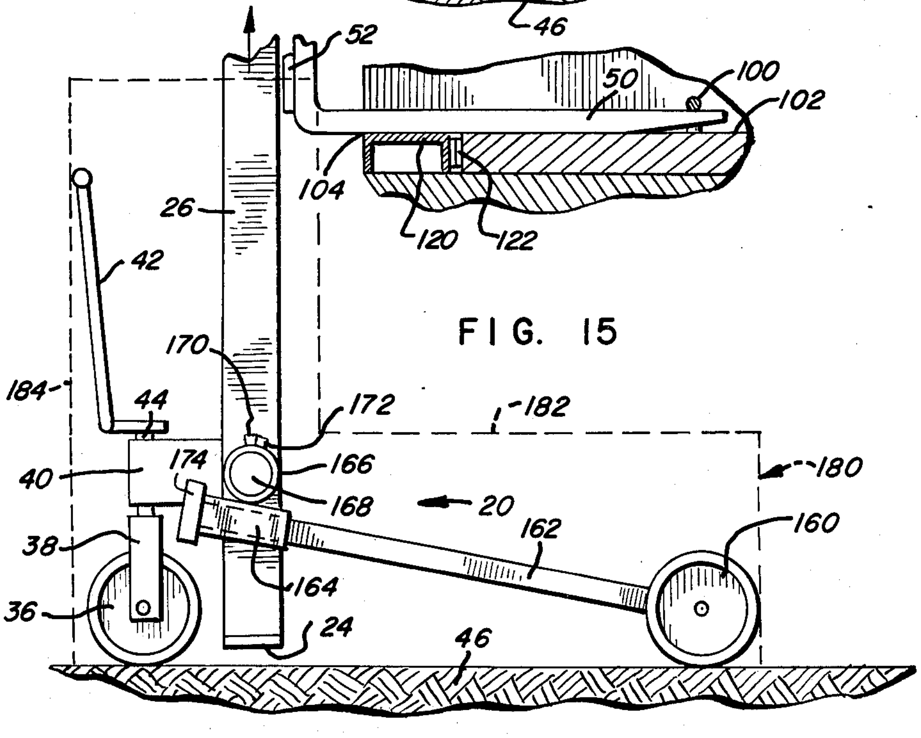
FIG. 15

FORKLIFT TRUCK

This invention relates to apparatus for storing a mobile forklift truck on top of a raised platform such as a loading dock or the floor of a transport truck, and to an improved forklift truck for use in such apparatus.

BACKGROUND OF THE INVENTION

Forklift trucks are known that can be carried around by a transport truck after they have pulled themselves up underneath the truck and have been secured to the bottom of the exterior of the truck for travel. These prior art forklift trucks are able to raise themselves up under the bed of a transport truck when the tines of the fork have been raised into an elevated position and are then secured in one way or another beneath the truck bed, after which the hydraulic drive of the forklift truck is reversed so that the fork presses downward instead of upward. The result is that the main body of the forklift truck rises, because of the downwardly directed force of the fork, until the forklift truck reaches the level where it is to be stored.

Forklift trucks of the type just described are disclosed in the patents to Joosten No. U.S. Pat. 3,710,965 and Grether et al. No. 3,799,379. As will be seen from FIG. 6 of the Joosten patent and FIGS. 8 and 12 of the Grether et al. patent, when these forklift trucks are in their storage position they extend backward from the rear end of the transport truck. As a result, they add an awkward length to the transport truck under which they are stored. In addition, they are exposed to the elements during bad weather, as well as to possible damage from collisions with another vehicle or a fixed structure such as a garage wall.

The earlier patent to Bultman U.S. Pat. No. 3,563,341 discloses a forklift truck that can raise itself up into a position to be loaded on the platform bed of a transport truck, but it accomplishes this only by means of an awkward and unwieldy stabilizer arrangement that is utilized to keep the apparatus in a stable position while it lifts itself up onto the platform of the transport truck. In addition, before and during this self-lifting process, the base of the Bultman forklift truck must be shifted so far to the rear that it presents an undesirable, awkward obstacle to any movement of the operator through the area behind the transport truck onto which the forklift truck is being loaded.

ADVANTAGES OF THIS INVENTION

This invention avoids all the disadvantages of the prior art forklift trucks just mentioned.

Using the apparatus of this invention, a mobile forklift truck can be stored on top of instead of underneath a raised platform to which it lifts itself from the ground, and onto which it moves itself by actuation of is drive means. The forklift truck of this invention can be stored entirely within a transport truck after it has lifted itself up to the platform bed of the truck, and can if desired be moved around upon the floor of the truck. This is accomplished without the use of any awkward stabilizing means and, when the improved forklift truck of this invention is used, without any interference between any part of the forklift truck and the underbody, bumpers, or other portions of the bottom of the transport truck.

Additional advantages are provided by the improved forklift truck of this invention because in its storage condition all of the forklift truck except for the forwardly extending fork times occupies a very small space fore-and-aft, and thus it takes up very little storage space in a transport truck after it has lifted itself up and moved itself into the truck. In addition, the small fore-and-aft dimension of the part of the truck other than the fork tines means that there are no awkward protuberances to interfere with the freedom of movement of the operator of the forklift truck behind the transport truck when the forklift truck has been moved into position to raise itself up for storage, and is in the process of raising itself up to the level of the platform top.

SUMMARY OF THE INVENTION

As pointed out above, the apparatus of this invention is used for self-storage of a mobile forklift truck on top of instead of underneath a raised platform. To save storage space, it is preferred that the forklift truck be collapsible from an operative condition in which main support wheels project forward beyond the frame assembly of the forklift truck, to a storage condition in which the main support wheels are located substantially entirely behind the forwardmost portion of the frame assembly and the tine lifting means.

The apparatus of this invention for self-storage of a forklift truck on a raised platform includes a pair of strirrups mounted on top of the raised platform to receive the fork tines. Each of these stirrups is spaced from the edge of the platform a distance less than the distance to which the tines extend beyond the forwardmost portion of the vertical frame member of the frame assembly, the tine lifting means, and the main support means when the forklift truck is in its collapsed condition. The apparatus also includes a collapsible support arm mounted on the raised platform, and movable between an out-of-the-way position and an operative position in which it is substantially level with the top of the platform.

With this construction, when the fork tines are positioned in the stirrups, the forklift truck is put into its storage conditions, the fork tines are lowered far enough with respect to the vertical frame member that the frame assembly is raised to the level of the raised platform top, the collapsible support arm is moved into its operative position where it engages the rearmost wheel means carried by the forklift truck, and the drive wheel is actuated, the forklift truck will move itself forward upon the platform until its tines are fully inserted in their respective stirrups and the forklift truck is positioned entirely within the platform edge.

The improved mobile forklift truck of this invention, which can store itself on top of a raised platform in the manner just described, has a ready condition in which it can be brought into position for self-storage on the raised platform, in which condition forwardly extending wheel means can move through a restricted "collapsing zone" having specified boundaries into out-of-the-way storage positions. The out-of-the-way storage positions are located substantially entirely forward of the rear end of the forklift truck when it is in its operative condition, and substantially entirely behind the forwardmost portion of the vertical frame member and tine lifting means. The collapsing zone has an upper boundary that is no higher than about 24 inches above the ground in that portion of the zone lying forward of the forwardmost portion of the vertical frame member and tine lifting means, and a rear boundary that does not extend any substantial distance behind the rear end of the forklift truck when it is in its operative condition. In an improved form of the forklift truck, the upper boundary of the defined portion of the collapsing zone is no higher than about 16 inches above the ground, and in a preferred form no higher than about 8 inches above the ground.

Several embodiments of support wheel means are disclosed. In one embodiment, the forklift truck has main support wheel means extending forwardly on support arms that are pivotally connected to the truck frame assembly, and the rear end of each of these arms has a sleeve attached to it which receives the support arm of a smaller, auxiliary wheel. This latter support arm is slidable in its sleeve so that when the main support wheels are raised into their out-of-the-way positions the auxiliary wheels can be slid forward to support the forklift truck in its ready condition for raising itself upon the raised platform. In a second embodiment, the main support wheel means are carried by arms which are pivoted to be swung both horizontally and vertically. In a third embodiment, each of the main support wheel arms is slidably secured in a sleeve member pivotally attached to the frame assembly of the forklift truck, so that the sleeve can rotate into a generally vertically position when the forklift truck is raised in the air, and at the same time the wheel support arm can be slid up through the sleeve to bring the support wheel into its out-of-the-way position. In another embodiment, auxiliary support wheels are carried by short arms that are rotatable independently of the main support wheel arms between their operative support positions and their out-of-the-way storage positions.

BRIEF DESCRIPTION OF DRAWINGS

The invention will now be described by reference to the accompanying drawings, in which:

FIG. 8 is a side elevation of the forklift truck of FIg. 7 after the truck has been raised to the level of the platform top and the collapsible support arm has been moved into its operative position;

FIG. 9 is a fragmentary perspective view of the stirrups on the raised platform and the support arm means associated with the plaftorm;

FIG. 10 is a fragmentary sectional view of another embodiment of stirrup means for use with this invention;

FIG. 11 is a fragmentary top plan view of another embodiment of the improved forklift truck of this invention, showing support wheel means in operative position in full lines and in an intermediate out-of-the-way position in phantom, with a raised platform also shown in phantom;

FIG. 12 is a fragmentary side elevation of the embodiment of FIG. 11 in its ready condition for positioning for self-storage on a raised platform;

FIG. 13 is a fragmentary top plan view of the embodiment of FIG. 11, with the main support wheel means swung horizontally into an intermediate out-ot-the-way position;

FIG. 14 is a fragmentary side elevation of the embodiment of FIG. 13, in which the main support wheel means has been swung up vertically into its final out-of-the-way storage position, with the drive wheel means shown supported on the collapsible support arm to the rear of the raised platform on which the forklift truck is to be stored;

FIG. 15 is a fragmentary side elevation of another embodiment of the forklift truck of this invention in which the fork tines of the forklift truck have been inserted in their respective stirrups on the top of the raised platform and the forklift truck is in its ready condition, in position for selfstorage on the raised platform;

DETAILED DESCRIPTION OF INVENTION

The various embodiments of the invention disclosed in the accompanying drawing will now be described in more detail.

Apparatus for Storing Forklift Truck

Figure 1:
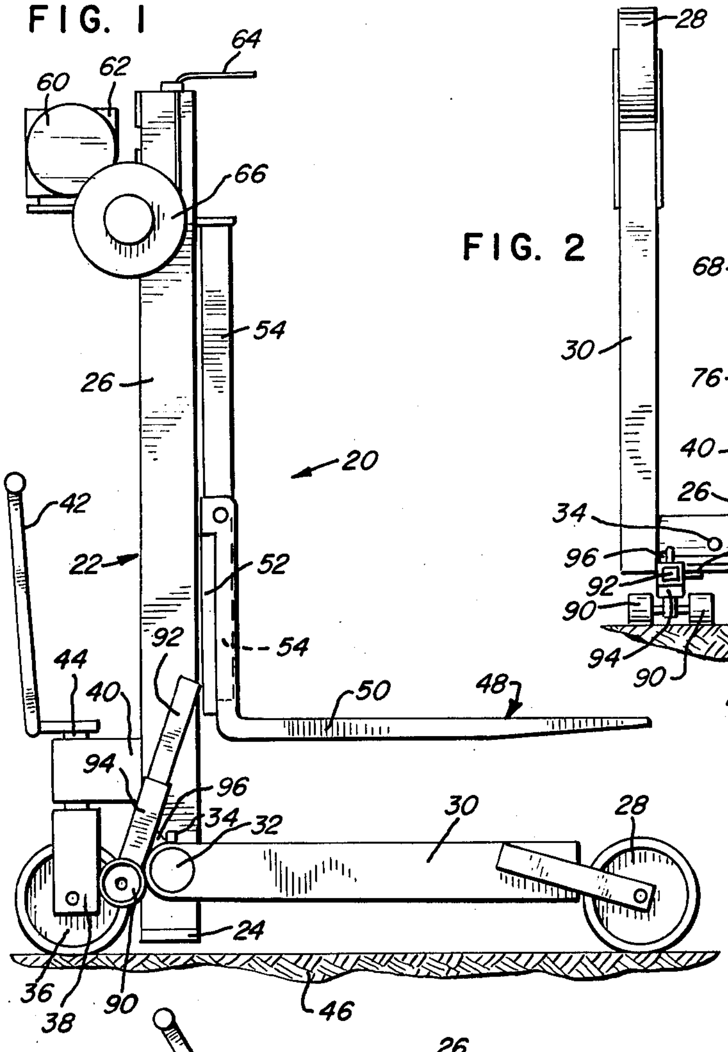
FIG. 1 is a side elevation of one embodiment of the improved forklift truck of this invention, with the forklift truck in its operative condition and the fork times near the lower end of their range of travel.

Collapsible forklift truck, FIG. 1 is a side elevation view of a mobile forklift truck that can be used with the apparatus of this invention. As there shown, forklift truck 20 includes frame assembly 22 comprising horizontal base member 24 and vertical frame member 26 extending upward therefrom. A pair of main support wheels 28 extends towards the front of forklift truck 20, each of the wheels being carried by an arm 30, rectangular in cross-section and pivotally mounted on an axle 32 carried by vertical frame member 26. Each arm 30 is maintained in its operative position by the engagement of removable leg position pin 34 with a hole suitably located in axle 32. The arm is laterally adjustable in a manner to be explained below (by reference to the fragmentary front elevation of forklift truck 20 in FIG. 2) in the further description of the improved forklift truck of this invention.

Figure 7:
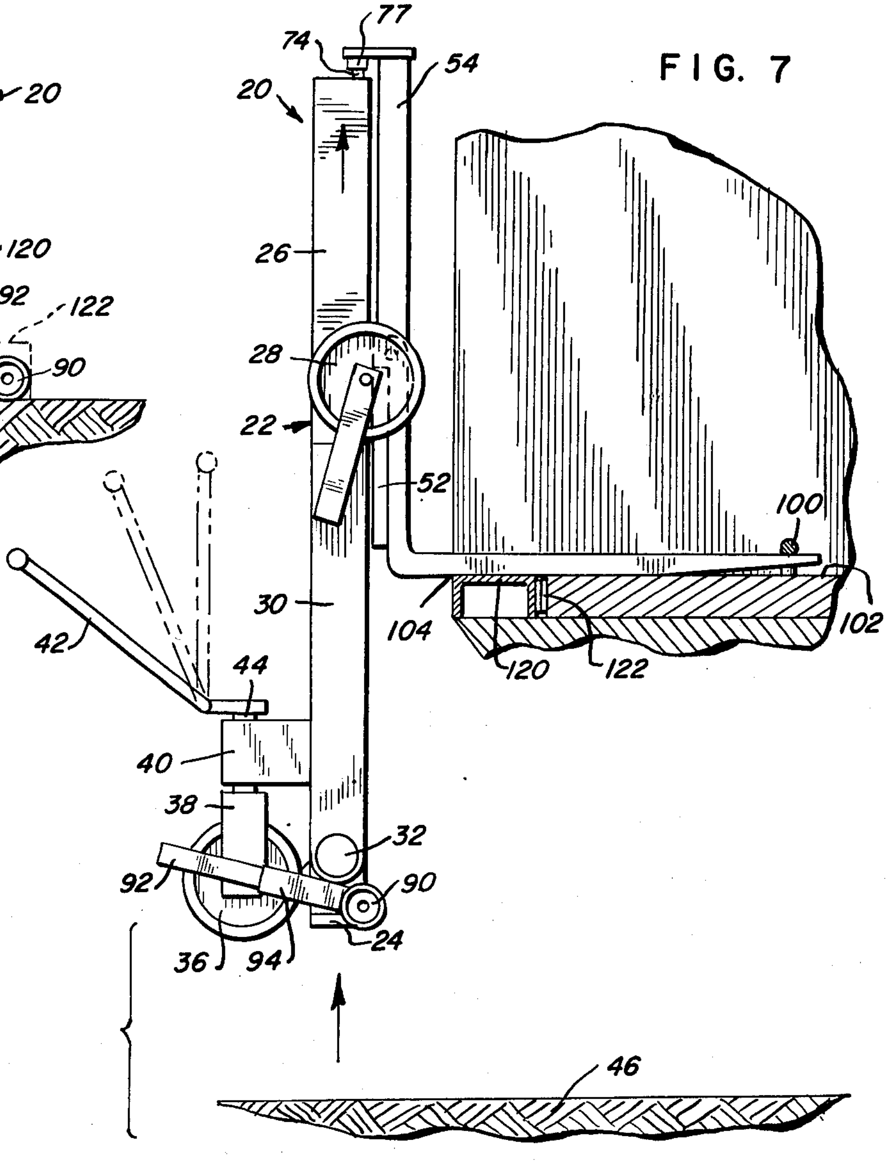
FIG. 7 is a side elevation of the forklift truck of FIG. 6 after the fork tines have been lowered far enough with respect to the frame assembly to raise the frame assembly of the truck off the ground.

At the rear of forklift truck 20, hydraulic drive wheel 36 is rotatably mounted in carriage 38, which pivots in bracket 40 attached to vertical frame member 26, to permit forklift truck 20 to be steered as it is moved about in use. Steering lever 42 is connected to pivot post 44 to permit the operator of the forklift truck to guide the truck as it is moved along ground 46. Steering lever 42 may occupy any of several positions selected by the operator of forklift truck 20, as indicated in FIG. 7 of the drawing.

Fork 48 has a pair of generally horizontal tines 50. The fork is mounted on vertical frame member 26 at the front end thereof. Tines 50 extend forward from plate 52 and from upright post 54 extending upward from that plate. Members 52 and 54 together comprise lifting means movable to raise and lower tines 50 on vertical frame member 26.

Figure 2:
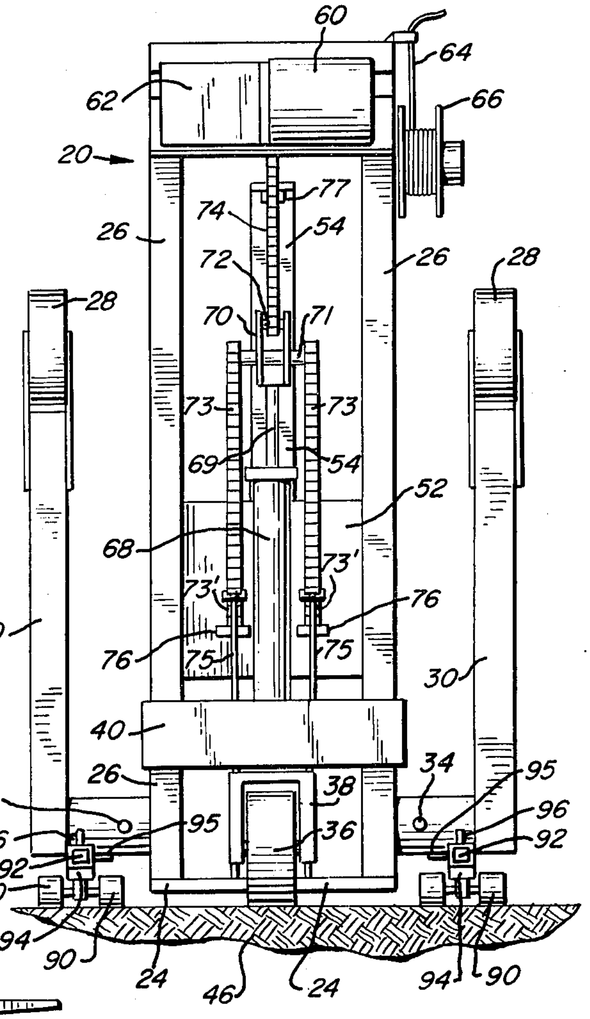
FIG. 2 is a rear elevation of the forklift truck of FIG. 1 in is ready condition, with the main support wheels raised into out-of-the-way storage positions and the auxiliary support wheels extended forward into their support positions.

Electric motor 60 and hydraulic power supply 62 are positioned at the top of vertical frame member 26 (FIGS. 1 and 2). Electric motor 60 is driven by current that passes through cord 64 from a suitable source of electrical power. Cord 54 is stored on rotatable reel 66, so that forklift truck 20 can be moved about freely in use.

FIG. 2 is a rear elevation view of the forklift truck of FIG. 1, showing main support wheel arms 30 rotated up into the substantially vertical position that is occupied by the arms when the truck is collapsed into its storage condition, and with steering lever 42 omitted for clarity. In FIG. 1 forklift truck 20 is shown in its operative condition in which main support wheels 28 project forward beyond vertical frame member 26, while in the collapsed storage condition of forklift truck 20 (shown in FIG. 7) main support wheels 28 are in positions located substantially entirely behind the forwardmost portion of vertical frame member 26 and tine lifting means 52,54. Arms 30 are held substantially vertical in the positions of FIG. 2 by the insertion of leg position pins 34 in a second pair of holes suitably located in axle 32. Tine lifting means as seen in FIG. 2, hydraulic cylinder 68 and piston rod 69 provide the power by which tine lifting means 52,54 raises and lowers fork tines 50. Hydraulic power is transmitted from power supply 62 to hydraulic drive wheel 36 and lift cylinder 68 by conventional high pressure hose means (not shown).

Hydraulic piston 69 carries mounting 70 at its top end, with horizontal shaft 71 at the bottom of mounting 70 and horizontal shaft 72 at the top. Shaft 71 has two idler gears at each end (hidden by drive chains 73) and shaft 72 has an idler gear supported by its middle portion (hidden by drive chain 74).

The near reach of each drive chain 73 is secured at its bottom end to an anchor post 75, which in turn is secured at its bottom end to frame assembly 22. The far reach of each drive chain 73, designated 73′ in FIG. 2, is connected at its bottom end to a bracket 76 secured to the rear side of movable plate 52. Each drive chain 73 is in engagement with an idler gear at the end of shaft 71.

The near reach of drive chain 74 is secured at its top end to frame assembly 22 by a suitable bracket (not shown). The drive chain passes around the idler gear carried by shaft 72 at the top of mounting 70, and the top end of its far reach is secured to the top end of upright post 54 by bracket 77.

As will be seen, when hydraulic piston rod 69 and mounting 70 at the top of the piston rod are caused to rise, drive chains 73 will pull movable plate 52 and upright post 54 up with respect to frame assembly 22. Fork tines 50, together with any load carried by the fork at the time, will rise along with plate 52 and post 54. As upright post 54 rises, it keeps drive chain 74 taut against the idler gear carried by shaft 72 with which it is in engagement, as already explained.

On the other hand, when hydraulic piston rod 69 and mounting 70 are lowered with respect to hydraulic cylinder 68, the idler gear on shaft 72, acting through drive chain 74, pulls upright post 54 down with respect to frame assembly 22. This movement lowers tines 50, together with any load carried by them at the time, or if the tines are held supported in an elevated position, will raise the rest of the forklift truck into the air. At the same time, brackets 76, which are attached to movable plate 52, move downward with respect to frame assembly 22, and this keeps drive chains 73,73′ taut against the idler gears carried at each end of shaft 71 with which they are in engagement, as already explained. Auxiliary wheel means as seen in FIG. 1, in this embodiment a pair of auxiliary wheels 90 is carried on each side of forklift truck 20 on an arm 92 rectangular in cross-section and slidably positioned in sleeve 94, which is attached to the end of main support wheel arm 30 opposite to the end on which main support wheel 28 is carried. In the embodiment shown, sleeve 94 is attached to arm 30 by means of supporting web 96.

The particular type of auxiliary wheel means 90, 92, 94 disclosed in this specification is an important feature, as will be explained in more detail below, of the improved forklift truck of this invention. Defined more generically, however, auxiliary wheel means that perform a somewhat similar function, although less effectively, are known in the prior art. Thus generically defined, auxiliary wheel means 90, 92, 94 constitute retractable auxiliary wheel means carried by frame assembly 22 which (a) support forklift truck 20 when main support wheels 28 have been moved into their out-of-the-way storage positions shown in FIG. 2, and (b) can themselves be moved into out-of-the-way positions when main support wheels 28 are moved into their operative positions as shown in FIG. 1.

As described up to this point, with auxiliary wheel means generically defined as just indicated, forklift truck 20 is a forklift truck of the general type disclosed in Grether et al. U.S. Pat. No. 3,799,379. The apparatus for storing this mobile forklift truck on a raised platform in accordance with the present invention — which avoids the disadvantages of various prior art systems in which a forklift truck is stored beneath a truck bed — will now be described. Stirrups on platform top an important feature of the forklift truck storage apparatus of this invention is the pair of stirrups 100 mounted on top 102 of the raised platform on which mobile forklift truck 20 is to be stored. One embodiment of these stirrups is shown in section in FIGS. 6-8, and a second embodiment in perspective view in FIG. 9. Each stirrup 100 is spaced from edge 104 of platform 102 by a distance that is less than the distance to which tines 50 extend beyond the forwardmost portion of vertical frame member 26, tine lifting means 52,54, and main wheel support means 28 when the forklift truck is in its collapsed storage condition (FIGS. 7 and 8).

In the embodiment of FIG. 9, each stirrup 100 is adapted to move between a lower out-of-the-way position and an upper operative position. The stirrups can therefore be lifted up whenever fork tines 50 are to be inserted in them for raising the forklift truck into position for storage on top of platform 102, and when not so used, they can be dropped down out of the way of any movement on the platform.

FIG. 10 shows a third embodiment of stirrups. In this figure, the stirrups are shown in their operative positions, with fork tines 50 fully inserted therein. Each stirrup 106 has only a single vertical shank 108, which is rotatably secured in platform 102 at 110. After the forklift truck has been moved forward onto platform top 102, horizontal arm 112 of each stirrup 106 can be rotated 90° so that the stirrup can be dropped into an out-of-the-way position and the forklift truck can then be moved forward still farther on the platform if desired. Collapsible support arm the second important feature of the apparatus of this invention is a collapsible support arm 120, shown in FIG. 9 in its operative position substantially level with platform top 102. In the embodiment shown, collapsible support arm 120 is hingedly attached to the platform at 122 to be swung horizontally into an out-of-the-way position when not in use, and has support structure 124 to hold it in its operative position when drive wheel 36 is in engagement with it (FIG. 8).

Figure 4:
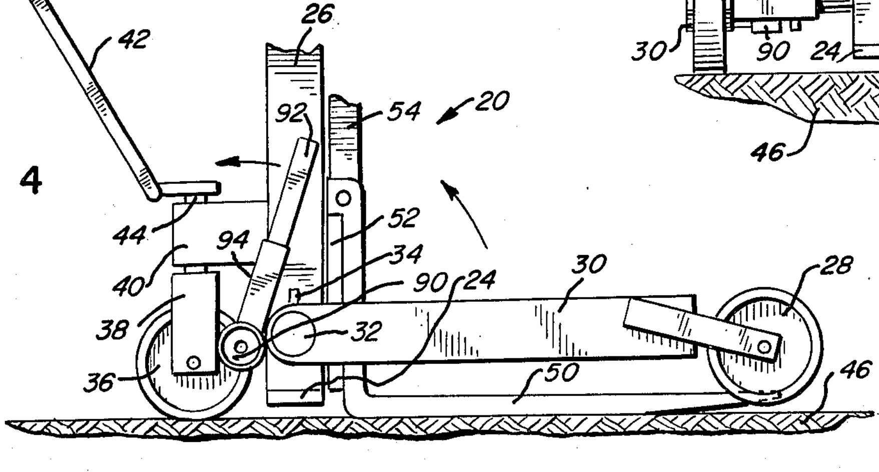
FIG. 4 is a fragmentary side elevation of the forklift truck of FIG. 1, with the fork tines lowered far enough to come into contact with the ground and raised the main support wheels off the ground.
Figure 5:
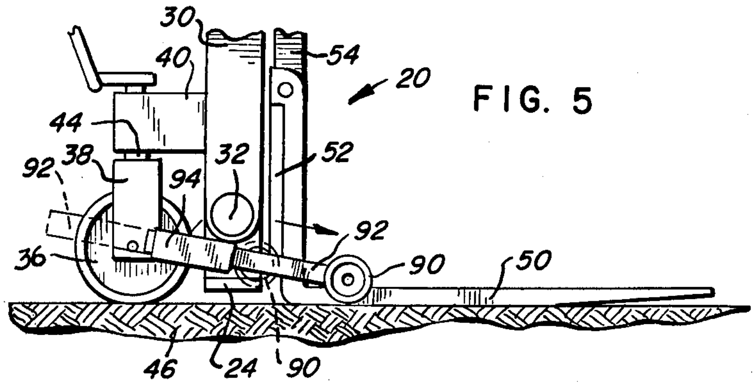
FIG. 5 is a fragmentary side elevation of the forklift truck of FIG. 1 in which the main support wheel means have been swung up onto their out-of-the-way storage positions, to bring the auxiliary support wheel means into the position shown in dashed lines, from which the auxiliary support wheel arm has been slid forward to the point where the auxiliary wheels have almost come into contact with the ground.

If desired, collapsible support arm 120 may be hinged to drop down vertically into an out-of-the-way position. Or, alternatively, it may be mounted on platform 102 in its operative position and removable from platform 102 altogether when it is not in use. Operation of self-storing forklift truck apparatus when it is desired to store mobile forklift truck 20 on raised platform 102, tines 50 are moved from their positions shown in FIG. 1 downward until they extend below main support wheels 28 and drive wheel 36, as shown in FIG. 4. As seen in the last mentioned figure, this raises main support wheels 28 off the ground, which permits leg position pins 34 to be released and main support wheel arms 30 to be swung up into their vertical positions shown in FIG. 5.

Figure 3:
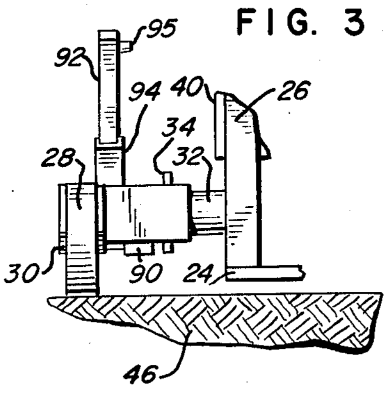
FIG. 3 is a fragmentary front elevation of the forklift truck of FIG. 1, showing the main support wheel in their outer operative position to span the width of a pallet when the forklift truck is in use.

Because auxiliary support arm sleeve 94 is secured to main support wheel arm 30 at an angle somewhat less than 90°, the vertical positioning of arm 30 brings sleeve 94 automatically into a position in which it tilts slightly downward from the horizontal in the forward direction. Auxiliary support wheel arm 92 thus tilts slightly downward from the horizontal, as seen in dashed line in FIG. 5, and is held in this position by position pin 95 (FIGS. 2 and 3). Upon disengagement of pin 95, arm 92 can be slid forward through sleeve 94 into the position shown in solid line in FIG. 5, where auxiliary support wheel 90 is just out of contact with ground 46. Position pin 95 is then reengaged with arm 92 to hold it in this new position.

Figure 6:
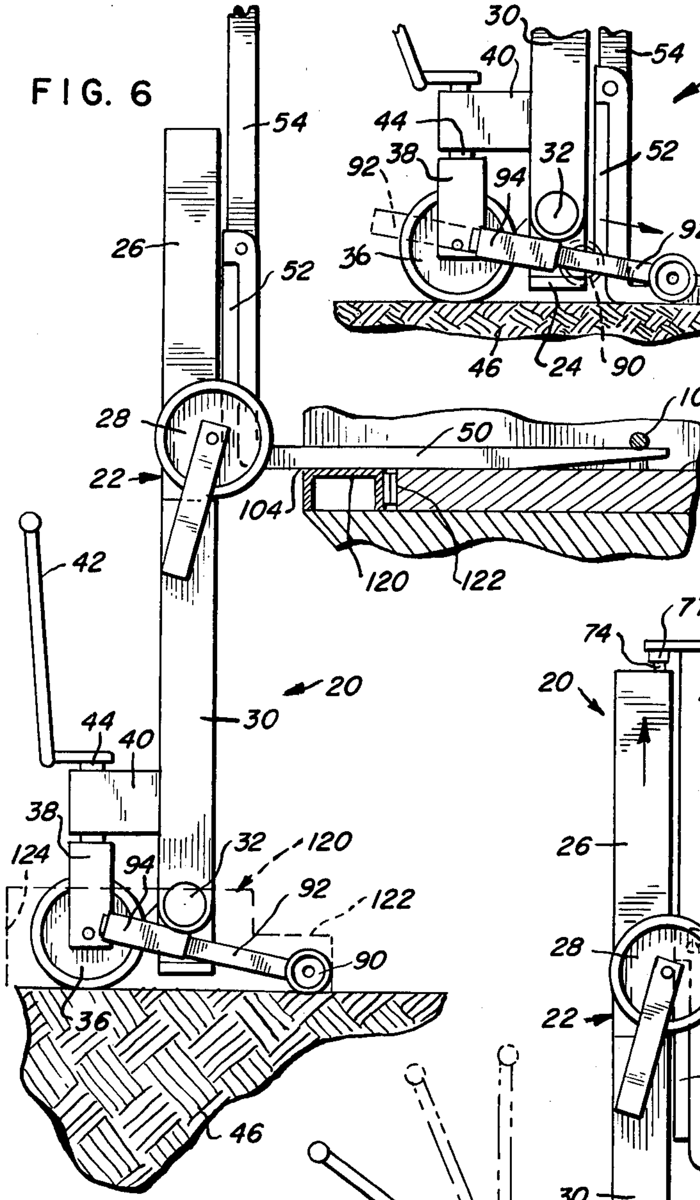
FIG. 6 is a side elevation of the forklift truck of FIG. 1 in its ready condition, with the fork tines raised and inserted in the stirrups on the raised platform (the view being partly in section and the drive means being omitted for clarity)

When fork tines 50 are raised off the ground again, auxiliary support wheels 90 drop into contact with the ground to help provide support, along with drive wheel 36, for the forklift truck (FIG. 6). With forklift truck 20 thus provided a stable three-point support by wheels 90,36,90, tine lifting means 52,54 can raise fork tines 50 to the level of the top of platform 102. The forklift truck is then rolled forward so that fork tines 50 are inserted in stirrups 100, in preparation for the forklift truck raising itself up to the top of the platform (FIGS. 6 and 7).

Between FIGS. 6 and 7, auxiliary support wheel arm 92 has been slid back through sleeve 94 into an out-of-the-way storage position. As will be explained more fully below in connection with the description of the improved forklift truck of this invention, with auxiliary support wheels 90 in the out-of-the-way position shown in FIG. 7, forklift truck 20 is in its storage condition.

When fork tines 50 have been lowered far enough with respect to vertical frame member 26 that frame assembly 22 carrying drive wheel 36 has been raised to the level of platform top 102, the movement of the fork tines is stopped. Collapsible support arm 120 is then moved into its operative position where it engages drive wheel 36 (FIG. 8). At this time, actuation of drive wheel 36 in contact first with support arm 120, and then with the top of platform 102, causes the forklift truck to move forward upon the platform until fork tines 50 are fully inserted in their respective stirrups 100.

First Embodiment of the Improved Forklift Truck of This Invention

The improved forklift truck of this invention is especially adapted for use with the self-storing apparatus that has been described for lifting a forklift truck to the level of the top of a raised platform, and moving it forward upon that platform for storage there. Need for stability to accommodate bulky loads, the fork tines of a mobile forklift truck used for handling cartons of a type to be loaded on a conventional transport truck often extend as far as three feet or more in front of the frame assembly of the truck. For adequate stability under load carrying conditions, the axes of rotation of main support wheels 28 of a forklift truck such as truck 20, for example, should be located a distance in front of vertical frame member 26 that is substantially equal to at least one-half the length of forwardly extending fork tines 50, and preferably more. (In the embodiment shown in FIGS. 1–8, it is seen that this distance is actually substantially equal to the entire length of tines 50.)

Under these circumstances, even if the main support wheel arms are pivotally attached to the frame assembly of the forklift truck 20, it will not be possible to swing the support arms up into out-of-the-way positions for self-storage of the forklift truck on top of a raised platform at the level of the usual loading dock or transport truck, after the forklift truck has been rolled forward far enough that its fork tines can be inserted in the stirrups on top of the platform. FIG. 6 — which shows that in their out-of-the-way storage positions wheels 28 of forklift truck 20 rise well above the top of platform 102, not to mention the bottom of the platform — provides proof of the physical impossibility of moving forwardly extending main support wheel means 28 into their collapsed storage condition after tines 50 have been inserted in stirrups 100.

The need for stability in the forklift truck's "ready condition" (FIG. 6) in which it can be brought into position for self-storage presents a problem similar to that just described for its load bearing operative condition (FIG. 1). As already pointed out, it is important that the fore-and-aft dimension of the forklift truck to be sotred within a motor truck be kept as small as feasible, in order to use as little as possible of the valuable storage space on the transport truck. Another advantage to a narrow fore-and-aft profile for any forklift truck to be used with the self-storage apparatus of this invention is that the collapsible support arm need not be so long in order to reach out under the drive wheel when the forklift truck has lifted itself to the level of the top of the raised platform on which it is to be stored. Another, though perhaps lesser, advantage is that the downward torque applied to the rear ends of the fork tines when the forklift truck lifts itself into the air is smaller when the forklift truck has a narrow fore-and-aft profile.

For the reasons indicated, the distance from the rear end of the forklift truck to the forwardmost portion of the frame assembly, tine lifting means and main support wheel means in the collapsed storage condition of the forklift truck should preferably be less than the length of the fork tines. Forklift truck 20 shown in FIG. 1, for example, has a fore-and-aft dimension exclusive of forwardly extending fork tines 50 which is only about one-half the length of the tines. Now, although the narrow fore-and-aft profile of forklift truck 20 makes for extremely economical use of storage space in any transport truck in which the forklift truck is stored, and provides the other indicated advantages as well, it presents at the same time a serious problem of stability when the forklift truck is put in its ready condition to be rolled forward into a position where fork tines 50 can be inserted in stirrups 100 on top of platform 102.

As can be seen from the drawing attached to this specification, the construction of the specific embodiments of the forklift truck of this invention disclosed is very sturdy, and as a consequence quite heavy. In addition, to save fore-and-aft space, electric motor 60 and hydraulic power supply 62 may be positioned at the top of frame assembly 22 of the forklift truck. As a result of the narrow profile of thr forklift truck and its high center of gravity, it could easily be toppled forward or backward, with resulting damage to the forklift truck itself or to persons standing nearby, if it is not provided with as long a wheel base as possible, even when it is not in condition to lift and carry a load but is simply to be moved about in its ready condition for insertion of fork tines 50 into their respective stirrups 100.

If auxiliary wheels of the type shown in FIG. 7 of the prior art Grether et al. patent, for example, were utilized to put forklift truck 20 in a "ready condition" in which it could be brought into position for self-storage, the axes of rotation of the auxiliary wheels in their support positions would be substantially behind the forwardmost portion of vertical frame member 22, and this would result in a dangerously unstable condition. In the improved forklift truck of this invention, it is essentially that when the forklift truck is in its ready condition for self-storage, the axes of rotation of the forwardmost wheels be located at least in front of the forwardmost portion of vertical frame member 26. In fact, in the embodiment of the invention shown in FIG. 6, when forklift truck 20 is in its ready condition, the axes of rotation of auxiliary wheels 90 are located farther in front of vertical frame member 26 than the axis of rotation of drive wheel 36 is located behind that member. For even greater stability, the support wheel means — whether auxiliary or main — extending forward of vertical frame member 26 in the ready condition can, if desired, be positioned with their axes of rotation still farther forward than is the case with the embodiment just referred to.

Restricted collapsing zone the greater the stability provided for forklift truck 20 in its ready condition, however, the greater is the likelihood that the retraction of forwardly extending support wheel means to move the forklift truck from its ready condition to its completely collapsed condition, for storage upon the top of a conventional loading dock or platform bed of a transport truck, will cause the support wheel means to strike a low hanging structural member below the raised platform, and thus make it impossible to complete placing the forklift truck in its storage condition. Raised platforms such as those under discussion (whether fixed or part of a mobile vehicle) customarily have substructures extending below the top of the platform by a considerable distance. The underbody, substructure, or bumper structure of a motor truck, for example, often extends to within approximately 24 inches of the ground, and very frequently down as close as 16 inches or even eight inches from the ground. (As an example of the substructure of the truck bed of a typical transport truck, see FIGS. 7–9 of Grether et al. U.S. Pat. No. 3,799,379.)

The improved forklift truck of this invention meets this problem by having the forwardly extending support wheel means (whether auxiliary or main) movable from their positions in front of vertical frame member 26 through a restricted, specially defined "collapsing zone" into out-of-the-way storage positions that are located substantially entirely forward of the rear end of the forklift truck when it is in its operative condition, and substantially entirely behind the forwardmost portion of vertical frame member 26 and lifting means 52,54. For this purpose, the term "support wheel means" includes both the support wheel and the arm carrying that wheel.

It is essential that the restricted collapsing zone of the improved forklift truck of this invention have an upper boundary that is no higher than about 24 inches above the ground in that portion of the zone lying forward of the forwardmost portion of vertical frame member 26 and tine lifting means 52,54. In this way, the support wheel means that extend forward in the ready condition of the forklift truck can be retracted into their out-of-the-way positions in the collapsed storage condition of the truck without striking downhanging parts of the raised fixed platform, or transport truck bed, that do not extend down any farther than 24 inches above ground level. In a still further improved form of the forklift truck of this invention, the upper boundary of the defined portion of the restricted collapsing zone is no higher than about 16 inches above the ground. In the preferred form, the upper boundary in question is no higher than about 8 inches above ground level.

It is also essential that the rear boundary of the restricted collapsing zone of the improved forklift truck of this invention not extend any substantial distance behind the rear end of the forklift truck when it is in its operative condition. As used here the term "substantial distance" means any distance that would produce undesirable interference with the freedom of movement of the operator behind the forklift truck.

In FIG. 6, platform bed 102 of the transport motor truck is shown located at a typical height above ground level of about 42 inches. In this embodiment of the improved forklift truck of this invention, restricted collapsing zone 120 of forklift truck 20, outlined in dashed lines, has an upper boundary 122 that is only about 5 inches above ground 46 in that portion of the collapsing zone lying forward of the forwardmost portion of vertical frame member 26 and tine lifting means 52,54. When support arm 92 is slid to the rear through sleeve 94 into the position shown in dashed lines in FIG. 5, arm 92 and auxiliary support wheel 90 carried by it will rise no higher than upper boundary 122, where they will not strike any downhanging projection from the bottom of any conventional transport truck into which the forklift truck is to be loaded.

At the same time, with the embodiment of FIG. 6, the end of support arm 92 will not extend to the rear beyond rear boundary 124 shown in dashed line. This fact means that arm 92 will not extend behind the rear end of the forklift truck by any substantial distance, as defined above, which avoids any undesirable interference with movement of the operator of the forklift truck behind the truck.

FIG. 3 is a fragmentary front elevation of the forklift truck of FIG. 1, showing another feature of this embodiment. In this figure, arm 30 by which main support wheel 28 is carried has been slid outward a distance on axle 32, so that the two main support wheels 28 can pass on both sides of a pallet of conventional size when forklift truck 20 is in use. Main support wheel 28 is maintained in this extended position by insertion of position pin 34 in a hole suitably located in axle 32.

When it is no longer necessary for the main support wheels to span a pallet, wheels 28 and their respective arms 30 can be retracted from the position shown in FIG. 3, so that the overall width of the forklift truck is then no more than about the width of one pallet. This feature provides a further savings in the space occupied by the forklift truck when it lifts itself up and moves forward into a transport truck for storage there, as well as when it is stored at ground level (as, for example, in a warehouse) with its main support wheel arms 28 either extending forward or raised to their vertical storage positions.

Second Embodiment of Improved Forklift Truck

A second embodiment of the improved forklift truck of this invention is illustrated in FIGS. 11–14.

FIG. 11 is a fragmentary top plan view with support wheel 128 carried by forwardly extending arm 130 in its operative position, shown in full lines. Arm 130 and support wheel means 128 carried by it are shown extending forward from the forklift truck frame assembly and beneath raised platform 102, which is drawn in phantom. In this figure, the intermediate out-of-the-way position of wheel 128 and arm 130, to be further described below in connection with FIG. 13, is also drawn in phantom.

Lateral extension 132, attached to the rear end of arm 130, has a square exterior and circular interior. When arm 130 is in its operative position, extension 132 extends a short distance into square U-shaped fitting 134, which is mounted on vertical frame member 26 with its open end facing to the rear. Cylindrical tie pin 136 is pivotally secured within fitting 134 at one end by pivot pin 138, thereby tying arm 130 to vertical frame member 26.

Tie pin 136 is pivotally secured at its outer end within lateral extension 132 by set screw 140, which engages circumferential groove 142 near the end of the cylindrical pin. However, when support wheel 128 is in its operative position, tie pine 136 is held against movement around pivot pin 138 by leg position pin or releasable stop means 144, which passes through aligned holes in fitting 134, lateral extension 132, and the tie pin. With tie pin 136 thus held within fitting 134, the square exterior of lateral extension 132 prevents support wheel arm 130 from pivoting vertically about the tie pin.

As is seen from FIG. 11, with releasable stop means 144 holding lateral extension 132 within fitting 134, the forklift truck is in its operative condition with support wheels 128 and their respective arms 130 extending forward to support the forklift truck when a load is positioned on fork tines 50. Removal of position pin 144 places the forklift truck in its "ready condition" so that it can be rolled into a position where the fork tines can be inserted in their respective stirrups, and the forklift truck can raise itself for self-storage on platform 102.

The position of the forklift truck after wheels 128 and 36 have been raised just above ground 46 by moving the fork tines downward a short distance is illustrated in FIG. 12. From the position shown in FIG. 12, support wheel 128 and arm 130 can be swung horizontally about vertical pivot pin 138, to move them sidewise into the intermediate out-of-the-way storage positions shown in phantom line in FIG. 11 and in full line in FIG. 13.

FIG. 13 is a fragmentary top plan view of this embodiment of the improved forklift truck of this invention, in which main support wheel 128 and arm 130 have been swung horizontally as just described into their intermediate out-of-the way positions, and the forklift truck has been lifted up until drive wheel 36 is level with the top of raised platform 102. If desired, at this juncture wheel 128 and arm 130 can be held against swinging down by replacing position pin 144 in the previously mentioned aligned holes in lateral extension 132 and tie pin 136.

When leg position pin 144 is removed again, or if it is not inserted as just described, lateral extension 132 can pivot about tie pin 136 so that main support wheel 128 and arm 130 are swung up vertically to bring them into final out-of-the-way storage positions as shown in side elevation in FIG. 14. in this position, arm 130 may be secured by any suitable means to the corresponding arm 130 on the other side of the forklift truck.

In this embodiment, restricted collapsing zone 150 through which forwardly extending support wheel means are moved from their operative positions into out-of-the-way storge positions has an upper boundary 152, in that portion of the zone lying forward of the forwardmost portion of vertical frame member 26 and the tine lifting means associated therewith, that is about 10 inches above ground 46 if wheels 128 and 36 are lifted approximately 1 inch above the ground before wheel 128 and its arm 130 are swung sidewise (FIG. 12). Collapsing zone 150 has a rear boundary 154 located approximately at the rear end of the forklift when it is in its operative condition.

Third Embodiment of Improved Forklift Truck

Figure 16:
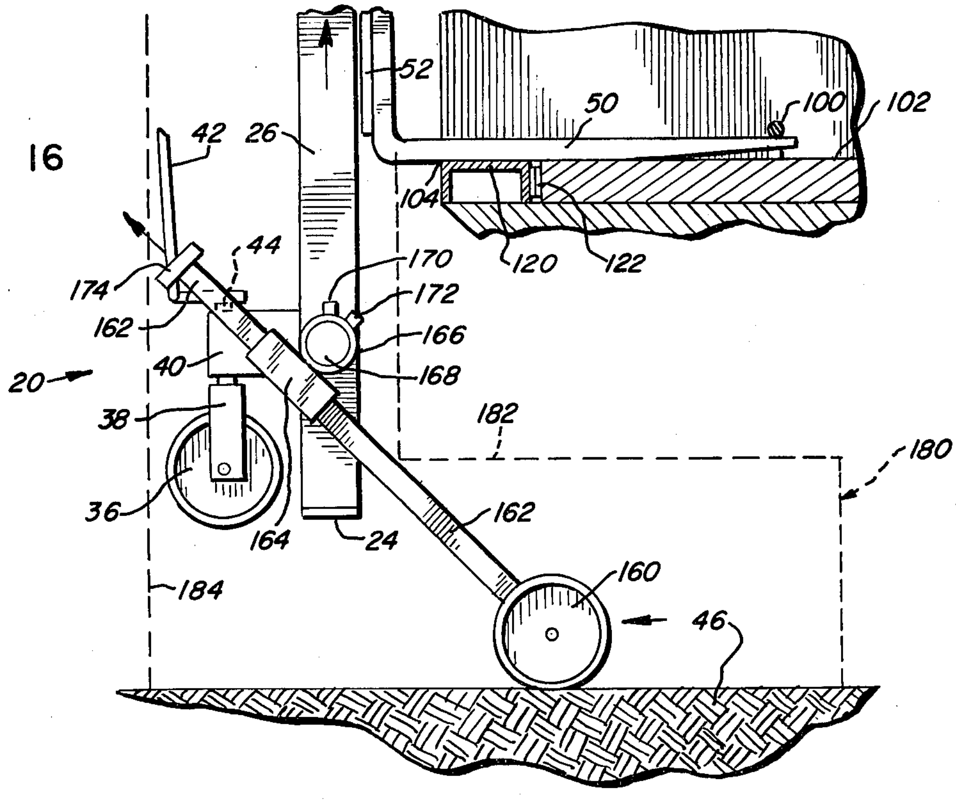
FIG. 16 is a fragmentary side elevation of the forklift truck of FIG. 15 in which the frame assembly has been raised off the ground by lowering the forklift tines, and the main support wheel arm has been slid backward in is supporting sleeve as the frame assembly was raised.
Figure 17:
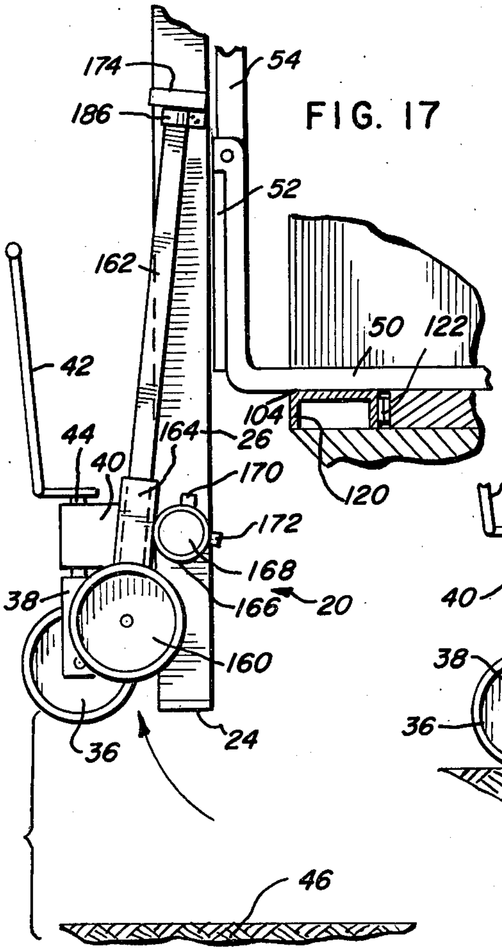
FIG. 17 is a view similar to that of FIG. 16, except that the frame assembly has been raised still further and the main support wheel arm slid all the way up through its supporting sleeve into its out-of-the-way storage position.

A third embodiment of the improved forklift truck of this invention is illustrated in FIGS. 15–17.

FIG. 15 is a fragmentary side elevation of the forklift truck of this invention with forwardly extending support wheel 160, carried by support wheel arm 162, in its operative, load-supporting position. Arm 162 is slidably positioned in sleeve 164. Sleeve 164 is in turn secured to sleeve 166 which is pivotally mounted on axle 168 carried by vertical frame member 26 of the forklift truck.

Vertical frame member 26 carries stop means 170, and rotatable sleeve 166 carries complementary stop means 172. Stop means 170 and 172 cooperate to limit the pivotal movement of sleeve 164, and thereby hold arm 162 in the operative position of support wheel 160.

The operative, load-bearing condition of the forklift truck shown in FIG. 15 is also its "ready condition" for self-storage on a raised platform in accordance with this invention. The forklift truck was moved into the position shown by insertion of form tines 50 in their respective stirrups 100 on top of raised platform 102 and is ready to be raised up and stored on the platform after wheels 160 have been moved directly from the positions shown into their storage positions through a restricted collapsing zone as defined in this invention.

In FIG. 16, fork tines 50 have been lowered to lift vertical frame member 26 and the associated parts of the forklift truck off ground 46. As this lifting process proceeds, the operator of the forklift truck pulls handle 174 of wheel support arm 162 in an upward and rearward direction. This permits support wheel 160 to roll backwards, and restricts the height to which the forward portion of support arm 162 rises in the area forward of vertical frame member 26 and tine lifting means 52,54. The collapsed storage condition of the forklift truck is shown in FIG. 17, which support arm 162 and handle 174 raised into a generally vertical position, where they are releasably secured to vertical frame member 26 by bracket 186.

Restricted collapsing zone 180 through which forwardly extending main support wheel 160 and its support arm 162 move as they are retracted from their operative positions into their out-of-the-way storage positions is seen from FIGS. 15 and 16 to have an upper boundary 182 that is about 18 or 19 inches above ground 46. Collapsing zone 180 has a rear boundary 184 which is located approximately at the rear end of the forklift truck when it is in its operative condition.

Fourth Embodiment of Improved Forklift Truck

In this embodiment of the improved forklift truck of this invention, auxiliary support wheels 190 are carried by support arms 192 which are pivotally attached at 194 to vertical frame member 26. An auxiliary support wheel 190 and its support arm 192 are shown in full line in FIG. 18 in their out-of-the-way storage positions, where they are secured by bracket 196 mounted on vertical frame member 26 so as to hold them entirely behind the forwardmost portion of vertical frame member 26 and the associated tine lifting means.

Figure 18:
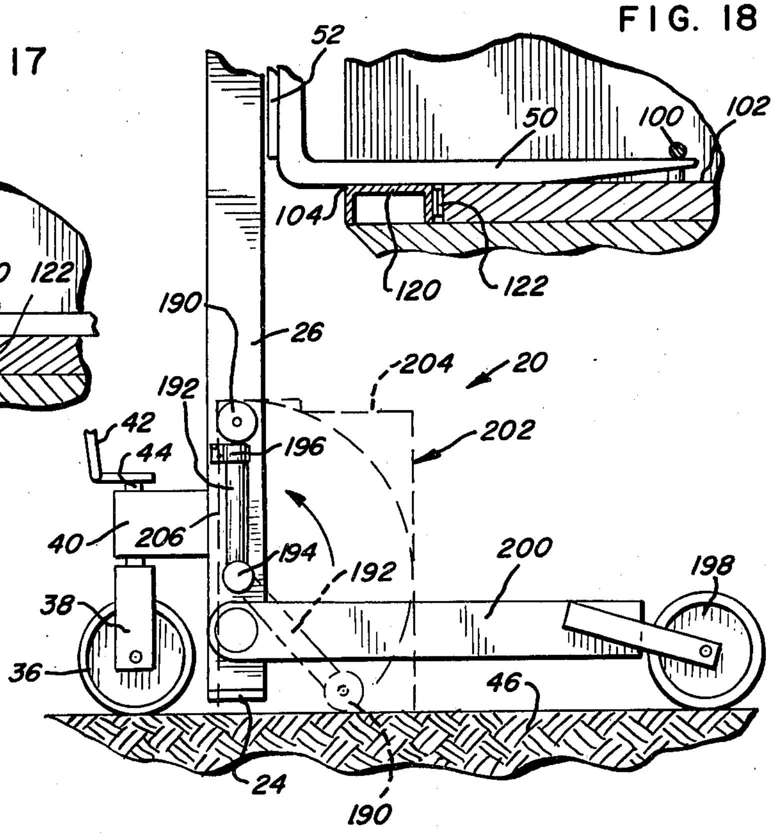
FIG. 18 is a fragmentary side elevation of another embodiment of the forklift truck of this invention, with main support wheel means in their operative position and auxiliary support wheel means shown in full line in an out-of-the-way storage position and in phantom in an operative support position.

Auxiliary support wheels 190 and arm 192 are shown in dashed line in FIG. 18 in their forwardly extending operative support positions in which the auxiliary wheel is located short of the position occupied by main support wheel 198 in the forklift truck's operative condition. Main support wheel 198 is carried by support arm 200, shown in its forwardly extending operative position in this figure.

This embodiment of the improved forklift truck of this invention is placed in its "ready condition," from which it can be moved into position for self-storage on top of raised platform 102, by swinging auxiliary support wheels 190 and their support arms 192 down into operative support positions where they are secured by stop means (not shown), and thereafter independently swinging main support wheels 198 and their support arms 200 vertically upward into their out-of-the-way storage positions. The forklift truck is then rolled forward to insert its fork tines in their respective stirrups 100 on top of raised platform 102, and auxiliary support wheels 190 and their respective arms 192 are thereafter swung back into their out-of-the-way storage positions. The forklift truck is then caused to lift itself up by moving its fork tines downward with respect to vertical frame member 26 until drive wheel 36 is level with the top of raised platform 102.

As will be seen from FIG. 18, collapsing zone 202 has an upper boundary 204 that is approximately 24 inches above ground 46. Its rear boundary 206 is located well forward of the rear end of the forklift truck when the truck is in its operative condition.

With all the embodiments of the improved forklift truck of this invention disclosed above, if the front support wheel means of the forklift truck's ready condition are comprised of auxiliary wheels that provide support when the main wheels have been moved into their storage positions, the forwardmost portion of the auxiliary wheels in their support positions will ordinarily be located short of the forwardmost portion of the main support wheels in their operative positions. In any case, when the auxiliary wheels are retracted from their operative support positions to their storage positions, it is essential that they and their support arms pass through positions all of which are at a level substantially below the height to which the main support wheels are raised while being moved into their out-of-the-way storage positions. This feature makes it possible for the auxiliary support wheels to be retracted into their out-of-the-way positions after the fork tines of the forklift truck have been positioned in their respective stirrups on the raised platform, and before the forklift truck has raised itself to the level of the platform top.

No additional description of the method of this invention is necessary, in view of the detailed description above of the operation of the self-storage apparatus of this invention, and the operation of the improved forklift truck of this invention that is especially adapted for use with that apparatus.

The above detailed description of this invention has been given for ease of understanding only. No unnecessary limitations are to be understood therefrom, since modifications will be obvious to those skilled in the art.

What is claimed is:

1. In apparatus for storing a mobile forklift truck on top of a raised platform, such as a loading dock or the platform bed of a conventional motor truck, said forklift truck including a frame assembly comprising a horizontal base member with a vertical frame member mounted thereon, main support wheel means and drive wheel means carried by said frame assembly to move the forklift truck about in use, a fork with a pair of generally horizontal tines mounted on said vertical frame member at the front end thereof, lifting means for raising and lowering said fork tines on said vertical frame member, and drive means for actuating said lifting means to raise and lower said fork selectively, said forklift truck being collapsible from an operative condition in which said main support wheel means projects forward beyond said vertical frame member to a storage condition in which said main support wheel means is located substantially entirely behind the forwardmost portion of said vertical frame member and said tine lifting means, the improvement which comprises:

a pair of stirrups mounted on top of said raised platform adapted to receive said tines, each of said stirrups being spaced from the edge of said platform a distance that is less than the distance to which said tines extend beyond the forwardmost portion of said vertical frame member, said tine lifting means, and said main wheel support means when the forklift truck is in its said collapsed condition; and a collapsible support arm mounted on said raised platform movable between an out-of-the-way position and an operative position in which it is substantially level with the top of said platform, whereby when said fork tines are positioned in said stirrups, said forklift truck is put into its said storage condition, said fork tines are lowered far enough with respect to said vertical frame member that said frame assembly with said drive wheel means is raised to the level of said platform top, and said collapsible support arm is moved into its operative position where it engages the rearmost wheel means carried by said frame assembly, actuating said drive wheel means in contact with one of said support arm and said raised platform will then cause the forklift truck to move forward upon the platform until said tines are fully inserted in their respective stirrups and said forklift truck is positioned entirely within said platform edge.

2. The forklift truck storage apparatus of claim 1 in which when the forklift truck is in its operative condition the axis of rotation of said main support wheel means is located a distance in front of said vertical frame member that is substantially equal to at least one-half the length of said fork tines.

3. The forklift truck storage apparatus of claim 1 in which the distance from the rear end of said forklift truck to the forwardmost portion of said frame assembly, said tine lifting means, and said main support wheel means when the forklift truck is in its said collapsed storage condition is less than the length of said fork tines.

4. The forklift truck storage apparatus of claim 3 in which said drive means for actuating said tine lifting means is positioned at the top of said vertical frame member.

5. The forklift truck storage apparatus of claim 3 in which said forklift truck includes retractable auxiliary wheel means carried by said frame assembly for support of the truck when said main support wheel means have been moved into their out-of-the-way storage positions, said auxiliary support wheel means being movable from out-of-the-way storage positions into a position forward of the forwardmost portion of said vertical frame member, but short of the forwardmost portion of said main support wheel means when the forklift truck is in its said operative condition.

6. The forklift truck storage apparatus of claim 5 in which said auxiliary support wheel means is movable into a position in which its forwardmost portion lies substantially entirely behind the forwardmost portion of said vertical frame member, said tine lifting means, and said main support wheel means when the forklift truck is in its said storage condition.

7. The forklift truck storage apparatus of claim 1 in which said stirrups mounted on said platform top are adapted to move between lower out-of-the-way position and upper operative positions before said tines are inserted in the stirrups.

8. The forklift truck storage apparatus of claim 1 in which said stirrups mounted on said platform top are adapted to move from their operative positions into inopertive out-of-the-way positions after said tines have been fully inserted in the stirrups and said forklift truck is positioned entirely within said platform edge.

9. In an improved mobile forklift truck adapted for self-storage on top of the platform bed of a conventional motor truck having a pair of stirrups mounted on top thereof, said forklift truck including a frame assembly comprising a horizontal base member with a vertical frame member mounted thereon, main support wheel means carried by a pair of arms pivotally attached to said frame assembly, and drive wheel means carried by said frame assembly to move the forklift truck about in use, a fork with a pair of generally horizontal tines mounted on said vertical frame member at the front end thereof, lifting means for raising and lowering said fork tines on said vertical frame member, and drive means for actuating said lifting means to raise and lower said fork selectively, said forklift truck being collapsible from an operative condition in which said main support wheel means projects forward beyond said vertical frame member to a storage condition in which said main support wheel means is located in an out-of-the-way position substantially entirely behind the forwardmost portion of said vertical frame and said tine lifting means, the improvement which comprises the feature that:

the axis of rotation of said main support wheel means, when said forklift truck is in its operative condition, is located a distance in front of said vertical frame member that is substantially equal to at least one-half the length of said fork tines, said forklift truck has a ready condition in which it can be brought into position for self-storage on said truck platform bed and in which condition support wheel means extends forward with the axis of rotation thereof located in front of the forwardmost portion of said vertical frame member, said fork tines being capable of being raised at least as high as the top of the platform bed of said conventional motor truck when the forklift truck is in its said ready condition and is standing upon the ground behind the motor truck, said support wheel means being movable from said location in front of said vertical frame member through a restricted collapsing zone into an out-of-the-way storage position located substantially entirely forward of the rear end of the forklift truck when it is in its operative condition and substantially entirely behind the forwardmost portion of said vertical frame member and said tine lifting means, without moving any support wheel means into a position forward of said forwardmost portion of said vertical frame member and said tine lifting means, and said collapsing zone has an upper boundary that is no higher than about 24 inches above the ground in that portion of the zone lying forward of the forwardmost portion of said verticle frame member and said tine lifting means, and a rear boundary that does not extend any substantial distance behind the rear end of said forklift truck when it is in its said operative condition, whereby when said fork tines are positioned in said stirrups and have been lowered far enough with respect to said vertical frame member to raise the forklift truck in its said ready condition just off the ground, said support wheel means that extend in front of said vertical frame member at that time can be moved through said collapsing zone to bring the forklift truck from its said ready condition to its said collapsed storage condition.

10. The forklift truck of claim 9 in which the upper boundary of said forward portion of said restricted collapsing zone is no higher than about 16 inches above the ground.

11. The forklift truck of claim 9 in which the upper boundary of said forward portion of said restricted collapsing zone is no higher than about 8 inches above the ground.

12. The forklift truck of claim 9 in which the distance from the rear end of said forklift truck to the forwardmost portion of said frame assembly, said tine lifting means, and said main support wheel means when the forklift truck is in its said collapsed storage condition is less than the length of said fork tines.

13. The forklift truck of claim 9 in which said main support wheels are slidable horizontally on their respective axles so that they can be moved outward to span a pallet when said forklift truck is in use, and can be retracted for storage at other times into positions in which said wheels occupy no more space laterally than said pallet does.

14. The forklift truck of claim 9 which includes auxiliary support wheel means carried by said frame assembly, said auxiliary support wheel means being movable from out-of-the-way storage positions into operative positions for support of the forklift truck when said main support wheels have been moved into their respective out-of-the-way storage positions, the forwardmost portion of said auxiliary support wheel means when in forklift truck supporting positions being located in front of said vertical frame member but short of the positions occupied by said main support wheel means in the forklift truck's said operative condition, and when in said out-of-the-way storage positions being located substantially entirely behind the forwardmost portion of said vertical frame member and said tine lifting means.

15. The forklift truck of claim 14 in which said main support wheel arms, when moved about their respective pivots into their out-of-the-way storage positions, are adapted to raise said main wheels to a given height, and in which said auxiliary support wheels are carried respectively by a second pair of arms retractably attached to said frame assembly, said auxiliary support wheels and their respective support arms, during movement between said out-of-the-way storage positions and said forklift truck supporting positions, being adapted to pass through positions all of which are at a level substantially below said given height, so that said auxiliary support wheels can support the forklift truck when said main support wheels have been moved into their out-of-the-way storage positions, and can themselves be retracted into their own out-of-the-way positions after said fork tines have been positioned in their respective stirrups on said platform but before said frame assembly is raised to the level of said platform top.

16. The forklift truck of claim 15 in which the arms carrying said auxiliary support wheels are pivotally attached to said frame assembly.

17. The forklift truck of claim 16 in which said auxiliary support arms are shorter than said main support wheel arms, and are rotatable between their operative support positions and their out-of-the-way storage positions independently of said main support wheel arms.

18. The forklift truck of claim 14 in which each of said auxiliary support wheel means is carried by an auxiliary support wheel arm and said arm is slidably secured in a sleeve member fixedly attached to one of said main support wheel arms, said sleeve extending at an angle to said main support wheel arm of less than 90° and being attached at the end thereof opposite the support wheel carried thereby, and in which said fork in its lowest position is lower than every other portion of said forklift truck in its operative condition, so that when said fork is in its lowest position said main support wheel arm can be swung up into its out-of-the-way storage position, and said sleeve member is at the same time automatically swung down into a position in which said auxiliary support wheel arm can be slid through said sleeve to bring the auxiliary support wheel means carried thereby into a support position for said frame assembly.

19. In an improved mobile forklift truck adapted for self-storage on top of the platform bed of a conventional motor truck having a pair of stirrups mounted on top thereof, said forklift truck including a frame assembly comprising a horizontal base member with a vertical frame member mounted thereon, main support wheel means carried by a pair of arms pivotally attached to said frame assembly, and drive wheel means carried by said frame assembly to move the forklift truck about in use, a fork with a pair of generally horizontal tines mounted on said vertical frame member at the front end thereof, lifting means for raising and lowering said fork tines on said vertical frame member, and drive means for actuating said lifting means to raise and lower said fork selectively, said forklift truck being collapsible from an operative condition in which said main support wheel means projects forward beyond said vertical frame member to a storage condition in which said main support wheel means is located in an out-of-the-way position substantially entirely behind the forwardmost portion of said vertical frame member and said tine lifting means, the improvement which comprises the feature that:

the axis of rotation of said main support wheel means, when said forklift truck is in its operative condition, is located a distance in front of said vertical frame member that is substantially equal to at least one-half the length of said fork tines, said forklift truck has a ready condition in which it can be brought into position for self-storage on said truck platform bed and in which condition said main support wheel means extends forward with the axis of rotation thereof located in front of the forwardmost portion of said vertical frame member, said fork tines being capable of being raised at least as high as the top of the platform bed of said conventional motor truck when the forklift truck is in its said ready condition and is standing upon the ground behind the motor truck, said forwardly extending main support wheel means being movable from said location in front of said vertical frame member through a restricted collapsing zone into an out-of-the-way storage position located substantially entirely forward of the rear end of the forklift truck when it is in its operative condition and substantially entirely behind the forwardmost portion of said vertical frame member and said tine lifting means, without moving any support wheel means into a position forward of said forwardmost portion of said vertical frame member and said tine lifting means, and said collapsing zone has an upper boundary that is no higher than about 24 inches above the ground in that portion of the zone lying forward of the forwardmost portion of said vertical frame member and said tine lifting means, and a rear boundary that does not extend any substantial distance behind the rear end of said forklift truck when it is in its said operative condition, whereby when said fork tines are positioned in said stirrups and have been lowered far enough with respect to said vertical frame member to raise the forklift truck in its said ready condition just off the ground, said main support wheel means that extend in front of said vertical frame member at that time can be moved through said collapsing zone to bring the forklift truck from its said ready condition to its said collapsed storage condition.

20. The forklift truck of claim 19 in which each of said arms carrying said main support wheel means is pivoted on said frame assembly to be swung horizontally, so that with said fork tines positioned in their respective stirrups and said tines lowered far enough with respect to said vertical frame member to raise said main support wheel means off the ground, said main support wheel arms can be swung sidewise into intermediate out-of-the-way storage positions, and releasable stop means are provided to hold said arms selectively in their operative positions.

21. The forklift truck of claim 20 in which each of said main support wheel arms is also pivoted on said frame assembly to be swung vertically, so that said arms can be swung both sidewise and up into final out-of-the-way storage positions.

22. The forklift truck of claim 19 in which each of said main support wheel arms is slidably secured in a sleeve member pivotally attached to said frame assembly, and which includes stop means on said frame assembly to limit the pivotal movement of said sleeve and hold said arm in the operative position of said main support wheel means, so that said sleeve can rotate into a generally vertical position when said forklift truck is raised up in the air after said fork tines have been positioned in said stirrups and said tines have been lowered with respect to said vertical frame assembly, and said wheel support arm can be slid through said sleeve to bring the support wheel carried thereby into its out-of-the-way position.

23. An improved mobile forklift truck adapted for self-storage on top of a raised platform, such as a loading dock or the platform bed of a conventional motor truck, having a pair of stirrups mounted on top thereof, said forklift truck including a frame assembly comprising a horizontal base member with a vertical frame member mounted thereon, main support wheel means and drive wheel means carried by said frame assembly to move the forklift truck about in use, said main support wheel means being carried respectively by a pair of arms pivotally attached to said frame assembly, a fork with a pair of generally horizontal tines mounted on said vertical frame member at the front end thereof, lifting means for raising and lowering said fork tines on said vertical frame member, and drive means for actuating said lifting means to raise and lower said fork selectively, said forklift truck being collapsible from an operative condition in which said main support wheel means projects forward beyond said vertical frame member to a storage condition in which said main support wheel means is located in an out-of-the-way position substantially entirely behind the forwardmost portion of said vertical frame member and said tine lifting means, said fork in its lowest position being lower than every other portion of said forklift truck in its said operative condition, in which the distance from the rear end of said forklift truck to the forwardmost portion of said frame assembly, said tine lifting means, and said main support wheel means when the forklift truck is in its said collapsed storage condition is less than the length of said fork tines, and which includes retractable auxiliary support wheel means, mounted on arms carried by said frame assembly, to support the forklift truck in a ready condition when said main support wheels have been moved into their out-of-the-way storage positions, each of said auxiliary support wheel arms being shorter than said main support wheel arms and being slidably secured in a sleeve member fixedly attached to one of said pivotable main support wheel arms, said sleeve extending at an angle to said main support wheel arm of less than 90° and being attahced thereto at the end thereof opposite the support wheel carried thereby, so that when said tine is in its lowest position said main support wheel arm can be swung up into its out-of-the-way storage position, and said sleeve member is at the same time automatically swung down into a position in which said forklift truck can be put into said ready condition by sliding said auxiliary support wheel arm through said sleeve to bring the auxiliary support wheel carried thereby into a support position for said frame assembly.

24. In apparatus for storing a mobile forklift truck on top of a raised platform, such as a loading dock or the platform bed of a conventional motor truck, said forklift truck including a frame assembly comprising a horizontal base member with a vertical frame member mounted thereon, main support wheels carried by arms pivotally mounted on said frame assembly and drive wheel means carried by said frame assembly to move the forklift truck about in use, a fork with a pair of generally horizontal tines mounted on said vertical frame member at the front end thereof, lifting means for raising and lowering said fork tines on said vertical frame member, and drive means for actuating said lifting means to raise and lower said fork selectively, said forklift truck being collapsible from an operative condition in which said main support wheel means projects forward beyond said vertical frame member to a storage condition in which said main support wheel means is located substantially entirely behind the forwardmost portion of said vertical frame member and said tine lifting means, said fork in its lowest position being lower than evey other portion of said forklift truck in its said operative condition, the improvement which comprises:

a pair of stirrups mounted on top of said raised platform adapted to receive said tines, each of said stirrups being spaced from the edge of said platform a distance that is less than the distance to which said tines extend beyond the forwardmost portion of said vertical frame member, said tine lifting means, and said first wheel support means when the forklift truck is in its said collapsed condition; and a collapsible support arm mounted on said raised platform movable between an out-of-the-way position and an operative position in which it is substantially level with said platform top, the distance from the rear end of said forklift truck to the forwardmost portion of said frame assembly, said tine lifting means, and said main support wheel means when the forklift truck is in its said collapsed storage condition being less than the length of said fork tines, and said forklift truck including retractable auxiliary wheels each of which is carried by an arm pivotally attached to said frame assembly to support the truck in a ready condition when said main support wheels have been moved into their out-of-the-way storage positions, each of said auxiliary support wheel arms being shorter than said main support wheel means and being slidably secured in a sleeve member fixedly attached to one of said pivotable main support wheel arms, said sleeve extending at an angle to said main support wheel arm of less than 90° and being attached thereto at the end thereof opposite the support wheel carried thereby, said auxiliary support wheel means being movable into an out-of-the-way storage position in which its forwardmost portion lies substantially entirely behind the forwardmost portion of said vertical frame member, said tine lifting means, and said main support wheel means when the forklift truck is in its said storage condition, whereby when said fork tines are positioned in said stirrups with the forklift truck in its ready condition, said fork tines are lowered far enough with respect to said vertical frame member that said frame assembly with said drive means is raised to the level of said platform top, and said collapsible support arm is moved into its operative position where it engages the rearmost wheel means carried by said frame assembly, actuating said drive wheel means while it is in contact with one of said support arms and said raised platform will then cause the forklift truck to move forward upon the platform until said tines are fully inserted in their respective stirrups and said forklift truck is positioned entirely within said platform edge.

25. A method for storing a mobile forklift truck on top of a raised platform, such as a loading dock or the platform bed of a conventional motor truck, having a pair of stirrups mounted on top thereof, said forklift truck including a frame assembly comprising a horizontal base member with a vertical frame member mounted thereon, main support wheel means and drive wheel means carried by said frame assembly to move the forklift truck about in use, a fork with a pair of generally horizontal tines mounted on said vertical frame member at the front end thereof, said tines being adapted to be inserted in said stirrups, lifting means for raising and lowering said fork tines on said vertical frame member, and drive means for actuating said lifting means to raise and lower said fork selectively, said forklift truck being collapsible from an operative condition in which said main support wheel means projects forward beyond said vertical frame member to a storage condition in which said main support wheel means is located substantially entirely behind the forwardmost portion of said vertical frame member and said tine lifting means, the distance said tines extend beyond the forwardmost portion of said vertical frame member, said tine lifting means, and said main wheel support means when the forklift truck is in its said collapsed condition being greater than the distance said stirrups are spaced from the edge of said platform, which comprises:

inserting said tines in their respective stirrups on top of said platform;

lowering the tines with respect to said frame assembly to raise the latter, along with said drive wheel means, substantially to the level of the top of said platform;

collapsing the forklift truck into its storage condition after said fork tines have been lowered far enough to raise the forklift truck off the ground;

engaging the rearmost wheel means carried by said frame assembly with support means attached to said platform after said frame assembly and its associated drive wheel means have been raised substantially to the level of the platform top; and actuating said drive wheel means while it is in contact with one of said support means and said raised platform, whereby the forklift truck is caused to move forward upon the platform until said tines are fully inserted in their respective stirrups and said forklift truck is positioned entirely within said platform edge.

26. The method of claim 25 which includes the step of moving said stirrups from lower out-of-the-way positions into upper operative positions before said tines are inserted in the stirrups.

27. The method of claim 25 which includes the step of moving said stirrups from their operative positions into inoperative out-of-the-way positions while said tines are inserted in the stirrups.

28. The method of claim 25 which includes the steps of:

putting said forklift truck in a ready condition in which it can be brought into position for self-storage on said raised platform, in which ready condition support wheel means extend in front of said vertical frame member, said support wheel means and their respective support arms being movable from their positions in front of said vertical frame member through a restricted collapsing zone into out-of-the-way storage positions located substantially entirely forward of the rear end of the forklift truck when it is in its operative condition and substantially entirely behind the forwardmost portion of said vertical frame member and said tine lifting means, said restricted collapsing zone having an upper boundary no higher than about 24 inches above the ground in that portion of the zone lying forward of the forwardmost portion of said vertical frame member and said tine lifting means, and a rear boundary that does not extend any substantial distance behind the rear end of said forklift truck when it is in its said operative condition; and thereafter, before said frame assembly and its associated drive wheel means are raised substantially to the level of the platform top, moving said support wheel means and their respective support arms through said collapsing zone into said out-of-the-way storage positions to bring the forklift truck to a collapsed storage condition in which the distance from the rear end of said forklift truck to the forwardmost portion of said frame assembly, said tine lifting means, and said main support wheel means is less than the length of said fork tines.

29. The method of claim 28 in which the upper boundary of said forward portion of the collapsing zone is no higher than about 16 inches above the ground.

30. The method of claim 28 in which the upper boundary of said forward portion of the collapsing zone is no higher than about 8 inches above the ground.

31. The method of claim 28 which includes the following steps:

before inserting said fork tines in their respective stirrups, first lowering the tines far enough to come into contact with the ground and raise said main support wheels off the ground;

bringing the forklift truck into its said ready condition by moving auxiliary support wheel means carried by said frame assembly from out-of-the-way storage positions into operative positions for support of the forklift truck, the forwardmost portion of said auxiliary support wheel means when in forklift truck supporting position being located short of the position occuped by said main support wheel means in the forklift truck's said operative condition;

thereafter moving said main support wheels from their operative positions into their respective out-of-the-way storage positions;

raising said fork tines with respect to such frame assembly to lower said auxiliary support wheel means to the ground;

positioning said fork tines in their respective stirrups on top of said platform; and moving said auxiliary support wheel means through said collapsing zone into their said out-of-the-way storage positions before lowering the fork tines to raise said frame assembly and its associated drive wheel means substantially to the level of the top of said platform.

32. The method of claim 28 which includes the step of swinging said main support wheel means sidewise from said forward operative positions back into out-of-the-way positions after said fork tines have been inserted in their respective stirrups and lowered far enough with respect to said frame assembly to raise said main support wheels off the ground, to bring said forklift truck into position to be raised to the top of the platform.

33. The method of claim 28 in which said main support wheel is carried by an arm that is both rotatably and slidably mounted on said frame member, and which includes the step of sliding said main support wheel arm backward, and simultaneously rotating said arm, with respect of said frame assembly, after said fork tines have been inserted in their respective stirrups and while they are being lowered with respect to said vertical frame assembly to raise said forklift truck to the top of said platform.

* * * * *